United States Patent
Ito et al.

(10) Patent No.: US 7,320,055 B2
(45) Date of Patent: Jan. 15, 2008

(54) STORAGE SYSTEM, AND CONTROL METHOD AND PROGRAM THEREOF

(75) Inventors: Mikio Ito, Kawasaki (JP); Akihito Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 11/090,075

(22) Filed: Mar. 28, 2005

(65) Prior Publication Data

US 2006/0123200 A1   Jun. 8, 2006

(30) Foreign Application Priority Data

Dec. 2, 2004 (JP) .............................. 2004-349530

(51) Int. Cl.
*G06F 12/00* (2006.01)
(52) U.S. Cl. ...................... 711/143; 707/206
(58) Field of Classification Search ................. 711/143
See application file for complete search history.

(56) References Cited

U.S. PATENT DOCUMENTS 6,397,309 B2 * 5/2002 Kedem et al. .............. 711/162
6,529,995 B1 * 3/2003 Shepherd .................... 711/114
2001/0002480 A1 * 5/2001 Dekoning et al. .......... 711/130
2001/0042222 A1 * 11/2001 Kedem et al. ................. 714/6

FOREIGN PATENT DOCUMENTS

JP     2000-182292    6/2000
JP     2002-92880     3/2002

* cited by examiner

*Primary Examiner*—Brian R. Peugh
*Assistant Examiner*—Hashem Farrokh
(74) *Attorney, Agent, or Firm*—Staas & Halsey LLP

(57) ABSTRACT

A cache processing unit manages the data, which is in a cache memory, in a page unit including plurality pieces of block data each of which serves as an access unit of a host, and processes input and output requests from a host to a storage device. In a case in which dirty data in a cache memory which is updated by a host and newer than stored data in a storage device is to be written back to the storage device, and when an incontinuous area is determined in a page of the dirty data, a write-back process unit reads out an incontinuous area from a storage device when a read command is issued, subjects it to a merge so as to generate a continuous area, and performs a write back by one time of write command issue.

12 Claims, 13 Drawing Sheets

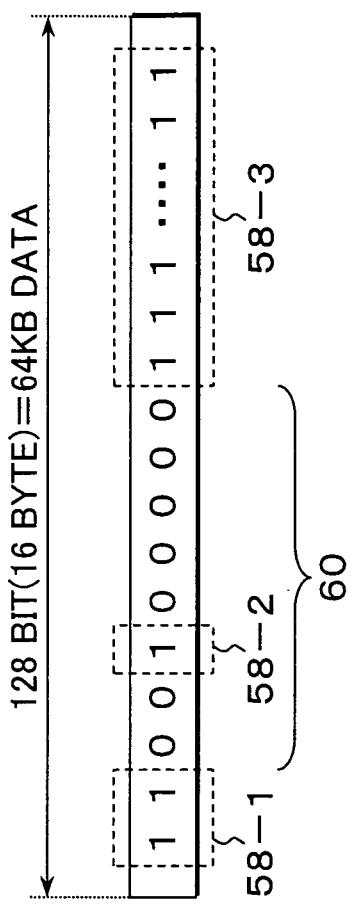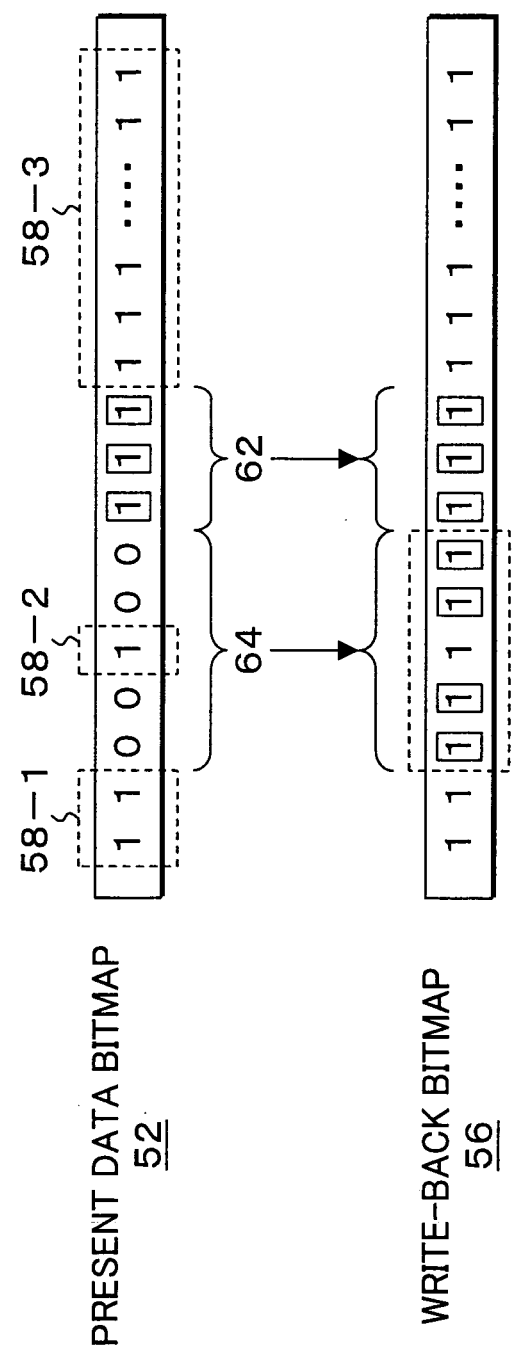
FIG. 6A  DIRTY DATA BITMAP 50
FIG. 6B  PRESENT DATA BITMAP 52
FIG. 6C  WRITE-BACK BITMAP 56

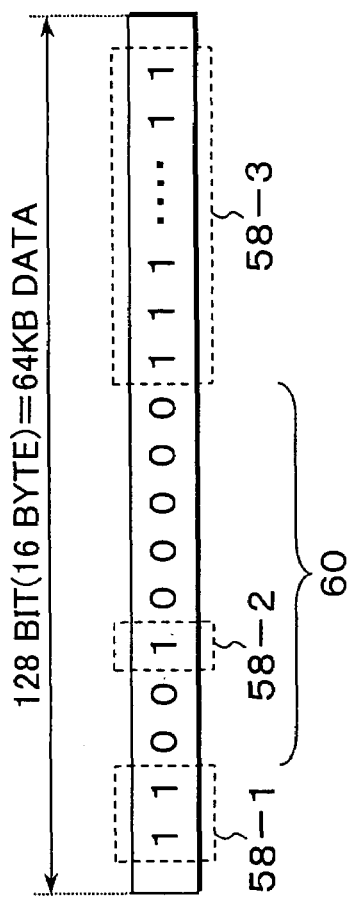
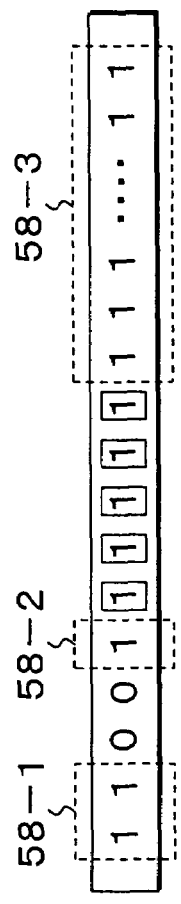
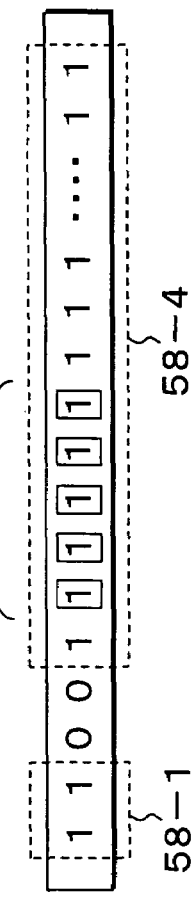
FIG. 7A  DIRTY DATA BITMAP 50
FIG. 7B  PRESENT DATA BITMAP 52
FIG. 7C  WRITE-BACK BITMAP 56

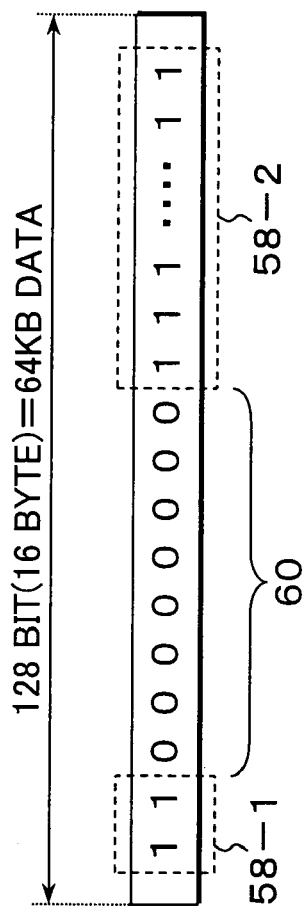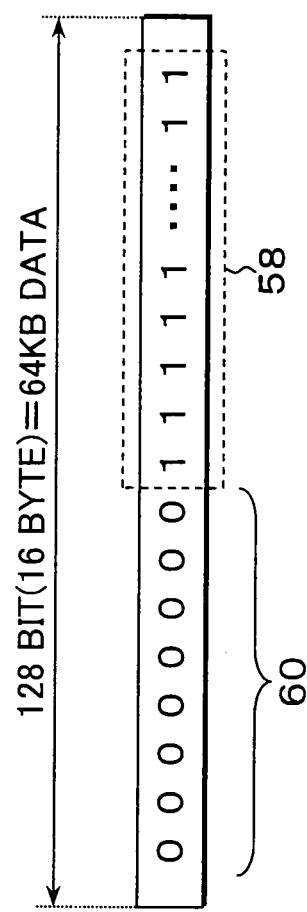

STORAGE SYSTEM, AND CONTROL METHOD AND PROGRAM THEREOF

This application is a priority based on prior application No. JP 2004-349530, filed Dec. 2, 2004, in Japan.

BACKGROUND OF THE INVENTION

1. Field of the Invention

The present invention relates to a storage system for processing, via a cache memory, input and output requests from an upper system to a storage device, and a control method and program thereof, and particularly relates to a storage system for writing back latest data that has been updated in a cache memory to a storage device, and a control method and program thereof.

2. Description of the Related Arts

Conventionally, in a RAID device for processing input and output requests from a host, a cache memory is provided in a control module, and input and output requests from the host are processed in the cache memory. Cache data of such RAID device is managed in a page unit. As shown in FIG. 1, a cache page 100 is managed in a manner that, for example, one page consists of 66,560 bytes. The cache page 100 comprises plurality pieces of user data provided in block units each of which serving as an access unit of a host, wherein one block user data is 512 bytes, an 8-byte block check code (BCC) is added to every 512 bytes, and a unit comprising 128 blocks of the 520-byte block is managed as one page, therefore, one page is 520×128=66,560 bytes. Also, a cache management table called a cache bundle element CBE is prepared for managing cache pages. In the cache management table, a management record corresponding to each page is provided, and the management record has, for example, a logical unit number LUN, a logical block address LBA, a dirty data bitmap 104 of FIG. 2B representing dirty data wherein one block corresponds to one bit, and a present data bitmap 102 of FIG. 2A representing presence of present data wherein one block corresponds to one bit in the same manner. One page of the cache management table corresponds to a size that corresponding to, in a ratio one to one, a strip of the disk device constituting a RAID group. In cache control of a RAID device, when a write is requested from a host, a cache page is assigned in a required quantity. However, write data is not always present in the entirety of one page. Therefore, with respect to the block updated in a write process within the page, a corresponding bit in the dirty date bitmap is set to bit 1, so as to manage presence of dirty data. Moreover, in a conventional cache control, when a free area in a cache memory is deficient, or when old cache data is to be removed by means of an LRU algorithm, a write-back process for writing back the dirty data, which is present in the page, to a disk device is performed.

However, in such conventional cache control process, when the dirty data present in a page is to be written back to the disk device, only the blocks represented by bit 1 which are managed in the dirty data bitmap are subjected to a write to the disk device. Therefore, when blocks of the dirty data are incontinuously present in the page, a write command is issued for each continuous area represented by a group of bits 1, so as to write it to the disk device. As a result, time for processing a command with respect to the disk device is elongated, thereby causing a problem that the performance is deteriorated.

According to the present invention, there are provide a storage system for suppressing the number of write-back command issue to a minimum level even when dirty data is incontinuously present in a page, thereby reducing write-back process time, and a control method and program thereof.

SUMMARY OF THE INVENTION

The present invention provides a storage system. The storage system of the present invention comprises:

a cache control unit for managing data, which is in a cache memory, in a page data unit including a plurality pieces of block data each of which serving as an access unit of an upper system, and processing an input or output request of the upper system with respect to a storage device; and a write-back process unit for reading out an incontinuous area from the storage device, subjecting it to a merge so as to generate a continuous area, and performing a write back, in a case in which dirty data in the cache memory which has been updated by the upper system and is newer than stored data in the storage device is to be written back to the storage device, and when the incontinuous area is determined in a page of the dirty data.

Herein, when a write-back process is to be performed by three or more times of command issue, the write-back process unit reads out an incontinuous area from the storage device and subjects it to a merge so as to generate a continuous area, and performs a write back in a page unit. When, as a distribution of dirty data in a page, at least one third continuous area is present between a first continuous area nearest the page head and a second continuous area nearest the page end via incontinuous areas, the write-back process unit determines an incontinuous area including the third continuous area between the first continuous area and the second continuous area, reads it out from the storage device, generates a continuous area by performing a merge with the read out data of the area which is present in the incontinuous area and other than the third continuous area, and performs a write back. The cache control unit comprises a dirty date bitmap for managing the presence of dirty data in the page by a bit corresponding to each block, and a present data bitmap for managing presence of data in the page by a bit corresponding to each block; wherein the write-back process unit references the dirty data bitmap and determines the incontinuous area of dirty data in the page, and when continuous present data is determined in the present data bitmap with respect to one end or both ends of the incontinuous area, performs a read for the remaining incontinuous area from the storage device and subjects it to a merge. The size of strip data of the storage device is same as the page size of the cache memory.

The present invention provides a control method of a storage system. The control method of a storage system according to the present invention comprises:

a cache control step of managing data, which is in a cache memory, in a page data unit including a plurality pieces of block data each of which serving as an access unit of an upper system, and processing an input or output request of the upper system with respect to a storage device;

and a write-back process step of reading out an incontinuous area from the storage device, subjecting it to a merge so as to generate a continuous area, and performing a write back, in a case in which dirty data in the cache memory which has been updated by the upper system and is newer than stored data in the storage device is to be written back to the storage device, and when the incontinuous area is determined in a page of the dirty data.

The present invention provides a program to be executed by a computer of a storage system. The program of the present invention causes the computer of a storage system to execute:

a cache control step of managing data, which is in a cache memory, in a page data unit including a plurality pieces of block data each of which serving as an access unit of an upper system, and processing an input or output request of the upper system with respect to a storage device;

and a write-back process step of reading out an incontinuous area from the storage device, subjecting it to a merge so as to generate a continuous area, and performing a write back, in a case in which dirty data in the cache memory which has been updated by the upper system and is newer than stored data in the storage device is to be written back to the storage device, and when the incontinuous area is determined in a page of the dirty data.

Details of the control method and the program of the storage system according to the present invention are basically same as the case of the storage system of the present invention.

According to the present invention, even when pieces of dirty data are separately present at at least three or more positions in a page, a write back can be performed by two times of command issue, i.e., issue of a read command for reading out an incontinuous area from a storage device and performing a merge, and issue of a write command for writing the continuous area, which has been generated by merge performed through a read, to the storage device; and even when dirty data is scattered and incontinuously present in a page, the number of command issue is suppressed to two, thereby shortening command processing time, and greatly contributing to performance enhancement of the whole system.

The above and other objects, features, and advantages of the present invention will become more apparent from the following detailed description with reference to the drawings.

BRIEF DESCRIPTION OF THE DRAWINGS

FIGS. 6A, 6B, and 6C are explanatory diagrams of bitmaps of dirty data, present data, and write-back data in a write-back process of the present invention;

FIGS. 7A, 7B, and 7C are explanatory diagrams of bitmaps in the case in which an incontinuous area of dirty data is recovered by present data in the write-back process of the present invention;

FIGS. 8A and 8B are explanatory diagrams of bitmaps of the dirty data that are excluded from the write-back process of the present invention;

DETAILED DESCRIPTION OF THE PREFERRED EMBODIMENTS

Figure 3:
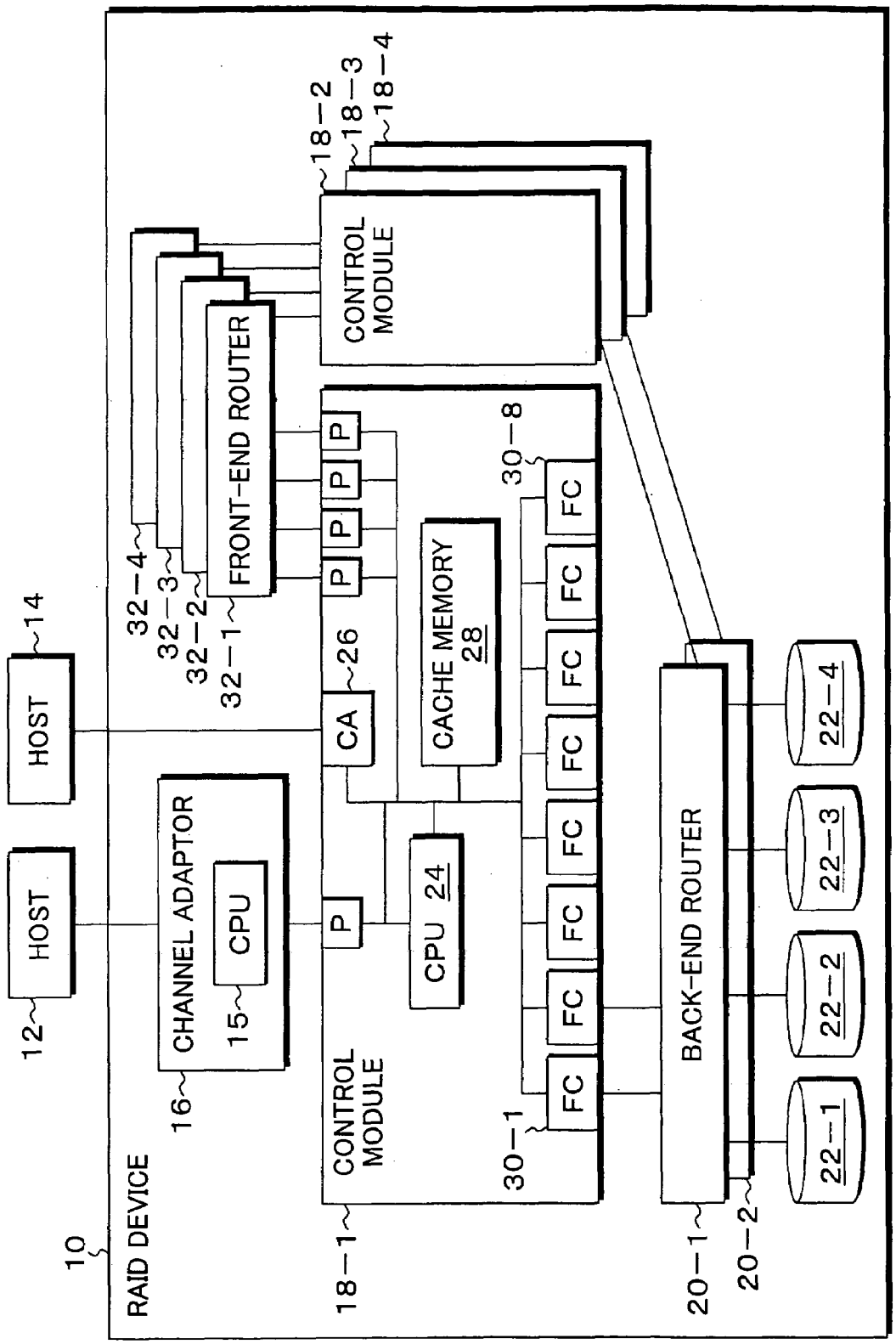
FIG. 3 is a block diagram of a hardware configuration of a RAID device to which the present invention is applied.

FIG. 3 is a block diagram of a hardware configuration of a RAID device to which the present invention is applied, wherein a large device configuration is shown as an example. In FIG. 3, a frame-based host 12 and a UNIX(R)/AI server-based host 14 are provided for a RAID device 10. In the RAID device 10, there provided a channel adaptor 16 equipped with a CPU 15, control modules 18-1 to 18-4, back-end routers 20-1 and 20-2,-disk devices 22-1 to 22-4 such as hard disk drives that serves as storage devices for constituting a RAID, and front-end routers 32-1 to 32-4. Although eight control modules can be mounted on the RAID device 10 in a maximum configuration, this example employs a four-module configuration employing the control modules 18-1 to 18-4. The channel adaptor 16 is equipped with the CPU 15, and connecting the framework-based host 12 with the control modules 18-1 to 18-4. In each of the control modules 18-1 to 18-4, as representatively shown in the control module 18-1, a CPU 24, a channel adaptor 26, a cache memory 28, and fibre channels 30-1 to 30-8 are provided. The channel adaptor 26 is connected to the UNIX (R)/AI-based host 14. By means of program control, the CPU 24 performs an input and output processing function for processing, in the cache memory 28, the input and output requests for write commands and read commands from the host 12 and making responses, control and management of the cache memory 28, write back of cache data to the disk devices 22-1 to 22-4 from the cache memory 28 via the back-end routers 20-1, 20-2, staging of disk data from the disk devices 22-1 to 22-4, etc. The front-end routers 32-1 to 32-4 connect the control module 18-1 to other control modules 18-2 to 18-4, so as to multiplex control. The control modules 18-1 to 18-4 are connected to the back-end routers 20-1 and 20-2, respectively, so as to perform data input and output processes by the CPU 24, which is in the control-module, by means of RAID control.

Figure 4:
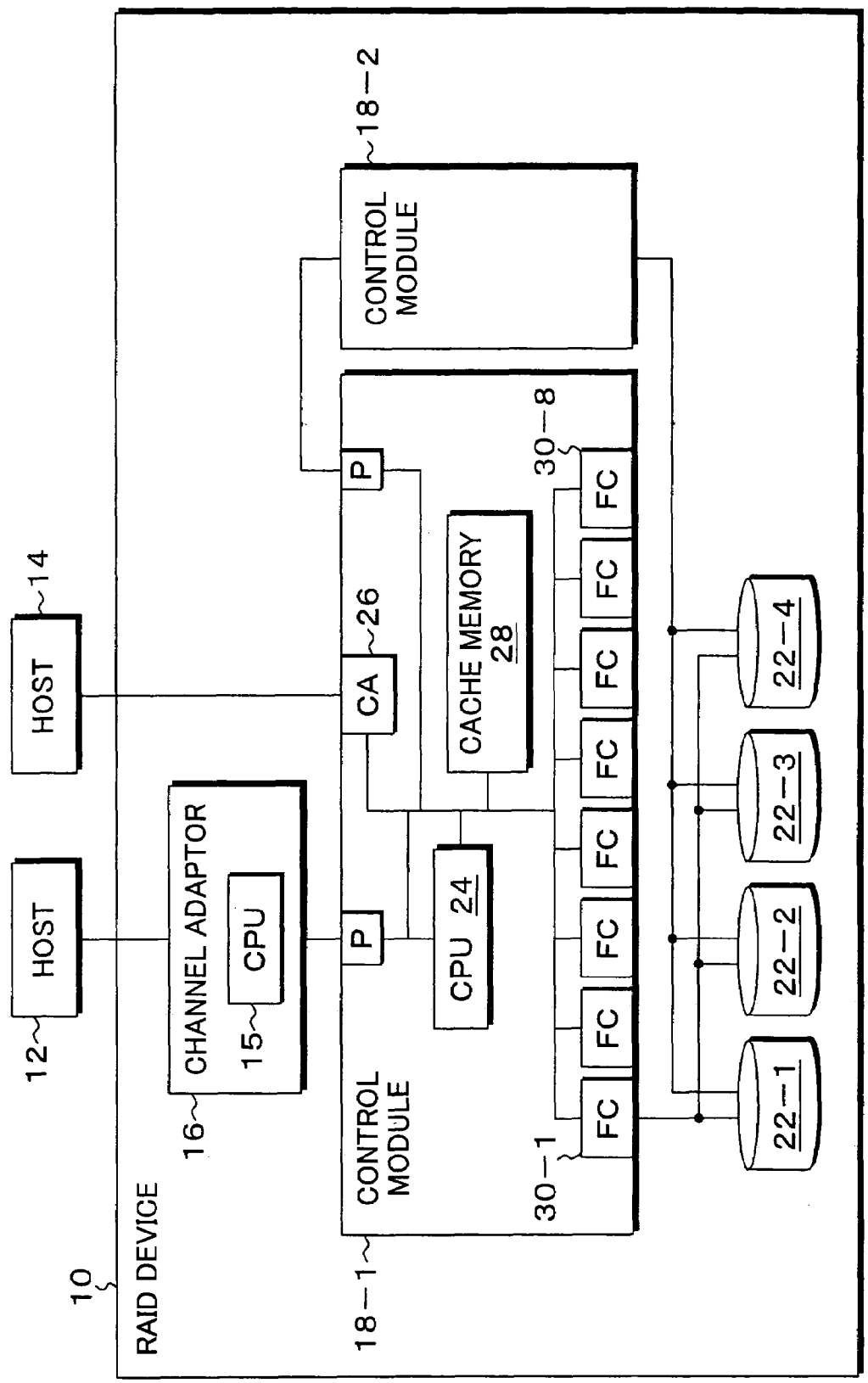
FIG. 4 is a block diagram of another hardware configuration of a RAID device to which the present invention is applied.

FIG. 4 is a block diagram of another hardware configuration of a RAID device to which the present invention is applied, wherein a small or a medium size device of which size is smaller than the large device of FIG. 3 is shown as an example. In FIG. 4, a RAID device 10 is provided with a channel adaptor 16 equipped with a CPU 15, double-structure control modules 18-1 and 18-2, and disk devices 22-1 to 22-4 for constituting a RAID. In each of the control modules 18-1 and 18-2, as representatively shown in the control module 18-1, a CPU 24, a channel adaptor 26, a cache memory 28, and fibre channels 30-1 to 30-8 are provided. The RAID device 10 of FIG. 4 corresponding to a small size and a medium size has a small size configuration of the RAID device 10 of FIG. 3 with-out the back-end routers 20-1 and 20-2 and the front-end routers 32-1 to 32-4, and other configuration is basically same as the embodiment of FIG. 3.

Figure 1:
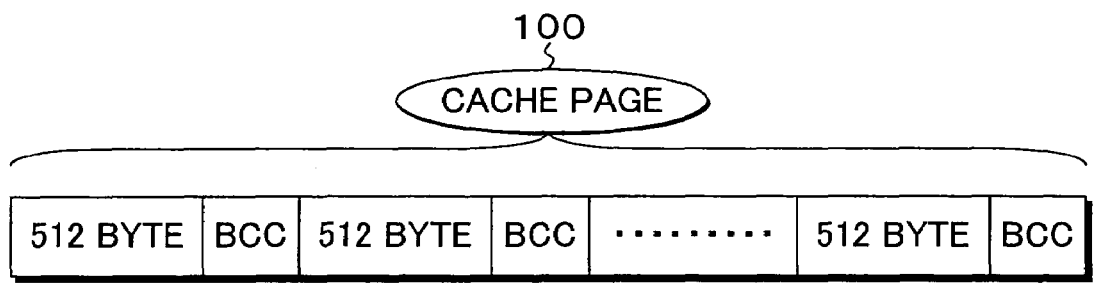
FIG. 1 is an explanatory diagram of a record configuration of a cache page in a conventional system.
Figure 2A:
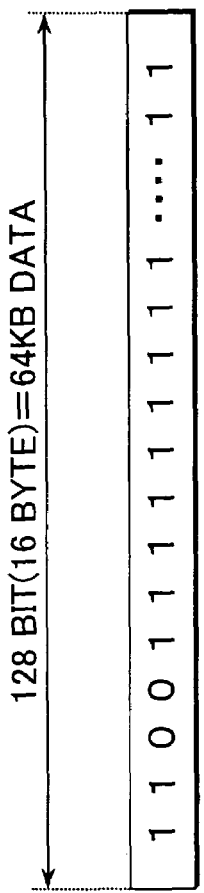
FIGS. 2A and 2B are explanatory diagrams of a dirty data bitmap and a present data bitmap provided in a conventional cache management table.
Figure 2B:
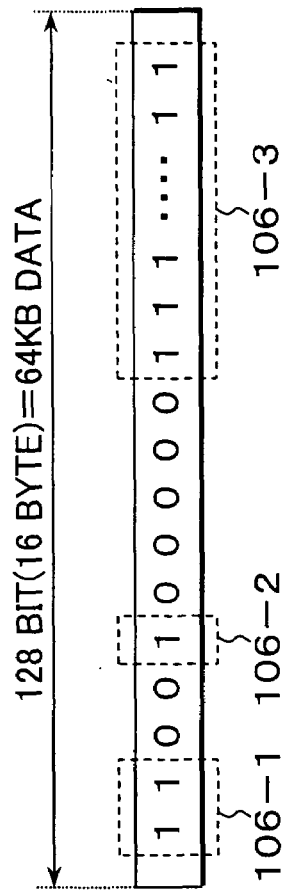
Figure 5:
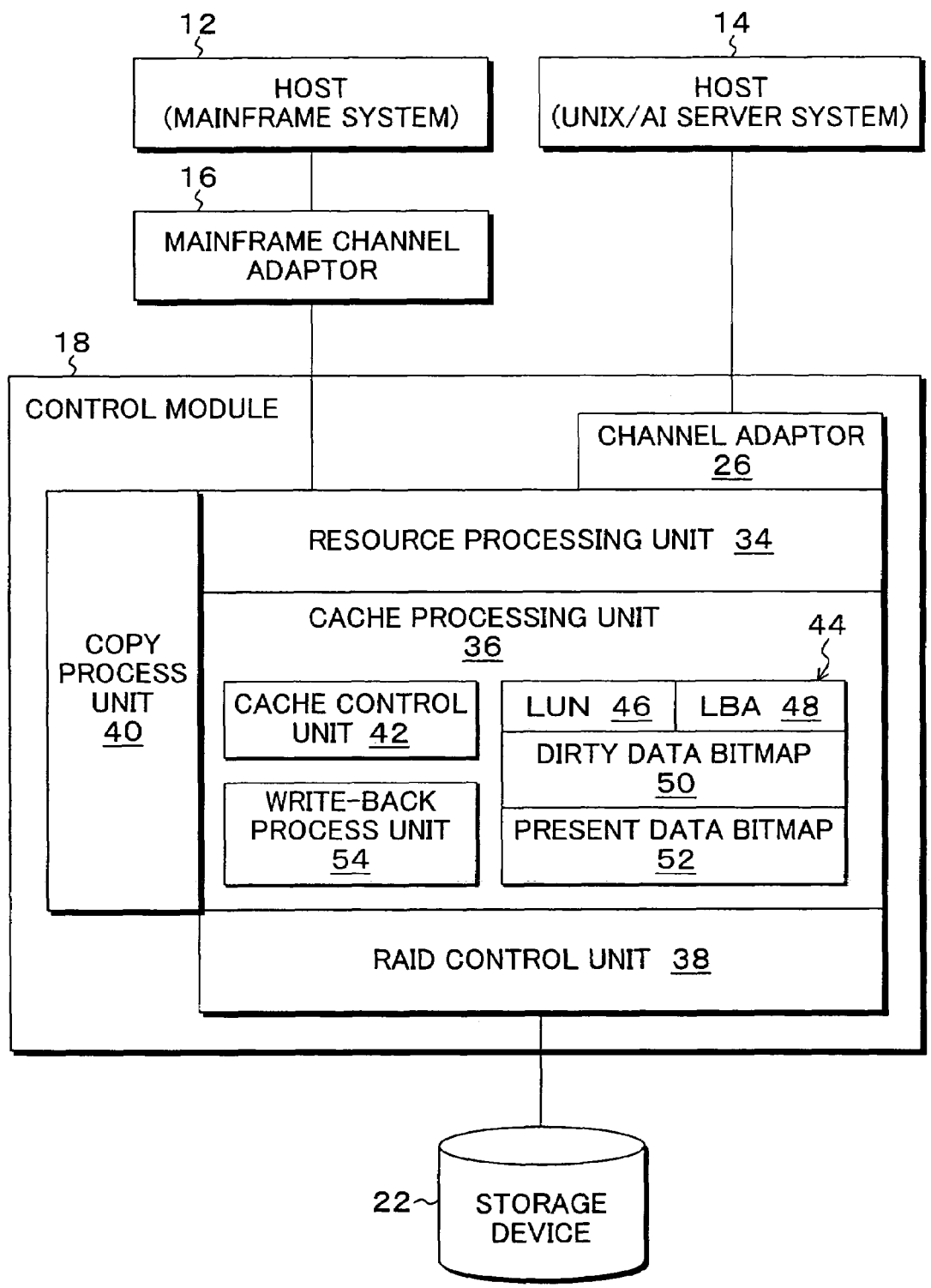
FIG. 5 is a block diagram of a functional configuration of a RAID device according to the present invention.

FIG. 5 is a block diagram of a functional configuration of a RAID device according to the present invention. In FIG. 5, functions of the RAID device 10 (shown in FIG. 4) are implemented by the program control of the CPU 24 (shown in FIG. 4) which is provided in a control module 18, and, as shown in the control module 18 of FIG. 5, are constituting a resource processing unit 34, a cache processing unit 36, a RAID control unit 38, and a copy process unit 40. In the cache processing unit 36, a cache control unit 42, a cache management table 44, and a write-back process unit 54 are provided. The cache memory 28 shown in FIG. 3 or FIG. 4 to be processed by the cache processing unit 36 is managed in page units as shown in FIG. 1, wherein one page consists of 66,560 bytes including 128 blocks of 520-byte block data that consists of 512-byte user data which is an access unit of the host side and an 8-byte BCC. The cache management table 44 performs record management for each page of such pages in the cache memory. As shown in the drawing, the record corresponding to a page comprises a logical unit number (LUN) 46, a logical block address (LBA) 48, a dirty data bitmap 50, and a present data bitmap 52. The dirty data bitmap 50 comprises 128-bit data in which each block of the 128 blocks constituting one page corresponds to one bit; wherein the bit corresponding to the block which has been updated by a write command from a host is set to 1, and each block other than that of dirty data is represented by a 0 bit. As well as the dirty data bitmap, the present data bitmap 52 is a 128-bit bitmap representing the 128 blocks constituting one page in bits, and represents presence of data including dirty data, wherein when data is present, the bit is 1, and when there is no data, the bit is 0. When the write-back process unit 54 receives a write-back instruction, which is to be performed to the storage device 22, from the cache control unit 42, and when any incontinuous area is determined with respect to the dirty data in the page which is serving as an object, the write back process unit reads out the incontinuous area from the storage device 22, performs a merge so as to generate a continuous area, and performs a write back to the storage device 22. In the write-back process, when the write back process is to be performed by three or more times of command issue due to the distribution state of the dirty data in the page, the incontinuous area is read out from the storage device and subjected to a merge, so as to generate a continuous area, and a write back is performed. Specifically, when the dirty data in the page can be write back to the storage device 22 by two times of write command issue, the write-back process is completed without modification; and only when a write command has to be issued three times or more, the incontinuous area of the dirty data in the page is read out from the storage device 22 and subjected to a merge, thereby making it into one continuous area of dirty data that is continuous in the page, in order to perform a process to enable the write-back process to be completed by two times of command issue in total, i.e., one time of read command issue for reading out the incontinuous data from the storage device 22, and a write back by means of one time of write command issue for the dirty data that has been made into a continuous area by merging data with the incontinuous area read out by the read command.

FIGS. 6A, 6B, and 6C include explanatory diagrams of bitmaps of dirty data, present data, and write-back data in a write-back process of the present invention. FIG. 6A is the dirty data bitmap 50, and, in this example, a bit 1 represents dirty data in a bit string of the 128-bit data corresponding to 128 blocks of one page. In this example, the dirty data distribution is divided into three areas, i.e., a continuous area 58-1 including two blocks in the head side of the page, following after that with two blocks spaced therebetween, a continuous area 58-2 including one block, and, at the end, a continuous area 58-3 including a plurality of continuous blocks; and has incontinuous areas, of which bit is 0, therebetween. The dirty data of the dirty data bitmap 50 of FIG. 6A requires three times of command issue, since a write command has to be issued for each of the continuous areas 58-1, 58-2, and 58-3 so as to write them back to the storage device 22. When a command is to be issued three times or more as described above, the write-back process according to the present invention is applied. In the write-back process of the present invention, with respect to the dirty data bitmap 50 of FIG. 6A, there determined an incontinuous area 60 that has to be merged with the continuous areas of dirty data through read-out from the storage device 22. In this case, the area including the continuous area 58-2 that is interposed between the continuous area 58-1 in the head side of the page and the continuous area 58-3 in the end side of the page is determined as the incontinuous area 60. Subsequently, the present data bitmap 52 of FIG. 6B is referenced, thereby determining presence of present data in the incontinuous area 60 which has been determined from the dirty data bitmap 50. In the present data bitmap 52 of FIG. 6B, presence of data including dirty data in each block is shown, wherein the continuous areas 58-1, 58-2, and 58-3 are dirty data, and, in addition to that, three blocks of present data are each present as a bit 1 ahead of the head side of the continuous area 58-3. An incontinuous area 64 that excludes a present data area 62 of the three blocks from the incontinuous area 60 determined in FIG. 6A is specified as a read object. Subsequently, with respect to the incontinuous area 64 specified in FIG. 6B, data is read out from the storage device 22, and, as shown in FIG. 6C, the read data of the blocks other than the continuous area 58-2 of dirty data is merged in the incontinuous area 64. Then, as shown in a write-back bitmap 56 of FIG. 6C, a write-back process is performed on the storage device by one time of write command issue, wherein the all blocks corresponding to one page serve as dirty data. As a result, in the case of FIGS. 6A, 6B, and 6C write back of the dirty data including the incontinuous area can be completed by two times of command issue, i.e., issue of a read command for reading out the incontinuous area 64 generated in FIG. 6B from the storage device, and one time of write command issue for writing back the dirty data of FIG. 6C that comprises continuous blocks and corresponds to one page.

FIGS. 7A, 7B, and 7C include explanatory diagrams in the case in which an incontinuous area of dirty data is recovered by present data in the write-back process of the present invention, and a normal write-back process is performed. Although the dirty data bitmap of FIG. 7A is same as the dirty data bitmap 50 of FIG. 6A, in the present data bitmap 52 of FIG. 7B, all blocks between the continuous areas 58-2 and 58-3 in the dirty data bitmap 50 are recovered by a present data continuous area 66. As a result, as shown in FIG. 7C, continuous areas in the dirty data in the write-back bitmap 56 are two, i.e., continuous areas 58-1 and 58-4. In this case, two times of command issue will suffice, i.e., issue of a write command for writing back the continuous area 58-1 to the storage device 22, and issue of a write command for writing back the continuous area 58-4 to the storage device 22. Therefore, a merge that is performed through a read from the storage device according to the present invention is not required, and a write-back process same as a conventional process is performed without modification.

FIGS. 8A and 8B include explanatory diagrams of bitmaps of the dirty data that are excluded from the write-back process of the present invention. In the dirty data bitmap 50 of FIG. 8A, the area between a continuous area 58-1 at the head of the page and a continuous area 58-2 at the end is an incontinuous area 60. Also in this case, two times of write command issue for writing back each of the continuous area 58-1 and the continuous are 58-2 will suffice, therefore, the write-back process of the present invention is not applied. In the case of a dirty data bitmap 50 of FIG. 8B, the first half of the page is an incontinuous area 60 and the latter half is a continuous area 58. In this case, write back can be performed by one time of write command issue for the continuous area 58, therefore, the write-back process of the present invention is not applied.

Figure 9A:
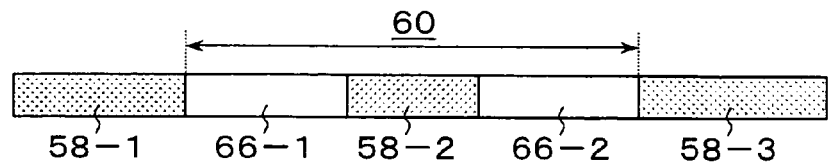
FIGS. 9A to 9I are explanatory diagrams correctively showing the distribution patterns of dirty data that can appear in a write-back.
Figure 9B:
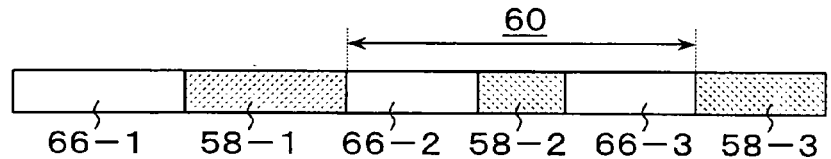
Figure 9C:
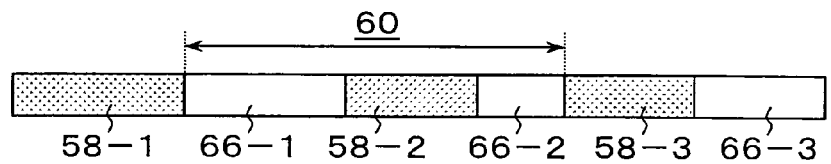

FIGS. 9A to 9I include explanatory diagrams correctively showing the distribution patterns of dirty data in a page that can appear in a write-back process of a cache memory. FIGS. 9A, 9B, 9C, and 9D are distribution patterns of dirty data to which the write-back process according to the present invention is applied, and other FIGS. 9E, 9F, 9G, 9H, and 9I are dirty data distribution patterns that are excluded from the write-back process of the present invention. FIG. 9A is a distribution pattern same as that of FIG. 6A, wherein a continuous area 58-1 is present in the head side of the page, a continuous area 58-3 is present at the end of the page, and a continuous area 58-2 is present therebetween via incontinuous areas 62-1 and 62-2. In this case, the area that includes the continuous area 58-2 and ranges from the position immediately after the continuous area 58-1 in the head side to the position immediately before the head of the continuous area 58-3 in the end side serves as an incontinuous area 60, the data thereof is read from the storage device 22 so as to merge the area excluding the continuous area 58-2 into continuous areas 66-1 and 66-2, and the entirety of one page is subjected to a write back by one write command. FIG. 9B shows a case in which the head of the page is an incontinuous area 66-1, and following that, there distributed a continuous area 58-1, an incontinuous area 66-2, a continuous area 58-2, an incontinuous area 66-3, and a continuous area 58-3. In this case, the data corresponding to the area represented by an incontinuous area 60 including the continuous area 58-2 is read from the storage device 22, and merged at the incontinuous areas 66-2 and 66-3, thereby writing back the area which is from the continuous area 58-1 to the page end by one write command. FIG. 9C shows a case in which the end of the page is an incontinuous area 66-3, and, in the front side of the page, continuous areas 58-1, 58-2, and 58-3 and incontinuous areas 66-1 and 66-2 are alternately present. Also in this case, with respect to an incontinuous area 60 including the continuous area 58-2, data is read from the storage device 22 so as to merge the incontinuous areas 62-1 and 62-2, and the data of the area which is from the continuous area 58-1 to the continuous area 58-3 is written back by one write command.

Figure 9D:
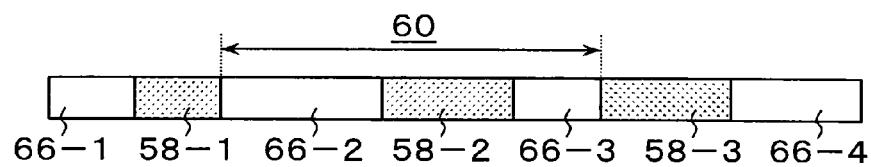
Figure 9E:
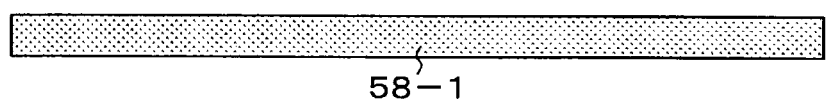
Figure 9F:
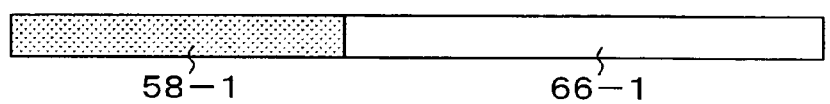
Figure 9G:
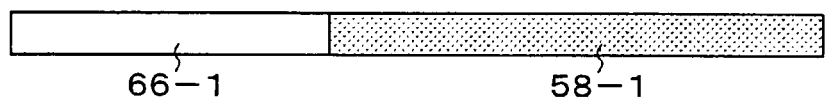
Figure 9H:
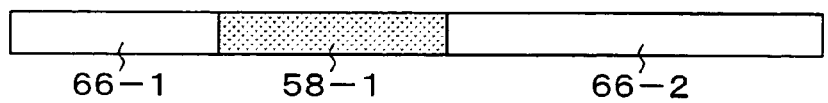
Figure 9I:
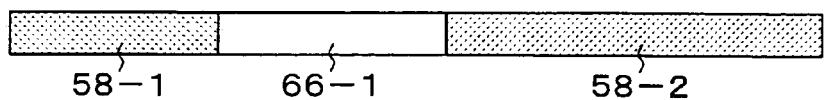

FIG. 9D shows a case in which the page head and the page end are incontinuous areas 66-1 and 66-4, respectively, and, therebetween, continuous areas 58-1, 58-2, and 58-3 and incontinuous areas 66-2 and 66-3 are alternately present. In this case, an incontinuous area 60 including the continuous area 58-2 is read from the storage device 22 so as to merge the incontinuous areas 66-2 and 66-3, and the data of the blocks from the continuous area 58-1 to the continuous area 58-3 is written back by one write command. When the distribution patterns of dirty data of FIGS. 9A to 9D to which the write-back process of the present invention is applied are summarized, it can be said that, when, as a distribution of the dirty data in a page, at least one third continuous area 58-2 is present between a first continuous area 58-1 that is nearest the page head and a second continuous area 58-3 that is nearest the page end, via incontinuous areas 66-2 and 66-3, an incontinuous area 60 including the third continuous area 58-2 between the first continuous area 58-1 and the second continuous area is determined and read out from the storage device 22, an continuous area is created for the areas 66-2 and 66-3 which are present in the incontinuous area 60 and other-than the third continuous area 58-2 by means of a merge of the read out data, and a write back is performed. FIG. 9E shows a case in which the entire area of the page is dirty data, wherein one write command will suffice. Therefore, this case is excluded from the write-back process of the present invention. FIG. 9F shows a case in which the head side is a continuous area 58-1 and the end side is an incontinuous area 66-1, wherein write back of the continuous area 58-1 can be performed by one write command. Therefore, this case is excluded from the write-back process of the present invention. FIG. 9G shows a pattern same as that of FIG. 8B, wherein one time of write back of the continuous area 58-1 will suffice. Therefore, this case is excluded from the write-back process of the present invention. FIG. 9H shows a case in which incontinuous areas 66-1 and 66-2 are present in front and back of a continuous area 58-1. Also in this case, the-continuous area 58-1 can be written back by one write command, therefore this case is excluded from the write-back process of the present invention. FIG. 9I shows a case having a distribution pattern same as that of FIG. 8A in which an incontinuous area 66-1 is present between continuous areas 58-1 and 58-2, wherein two times of write command issue will suffice for writing back each of the continuous areas 58-1 and 58-2. Therefore, this case is excluded from the write-back process of the present invention. FIGS. 9A to 9D employ the case, as examples, in which the continuous area 58-2 is present between the continuous area 58-1 in the head side and the continuous area 58-3 in the end side via the incontinuous areas 66-1 and 66-2. However, even when the number of the continuous areas that are alternately present between the continuous area 58-1 in the head side and the continuous area 58-3 in the end side via incontinuous areas is plural, the write-back process of the present invention is applied in a completely same manner.

Figure 10A:
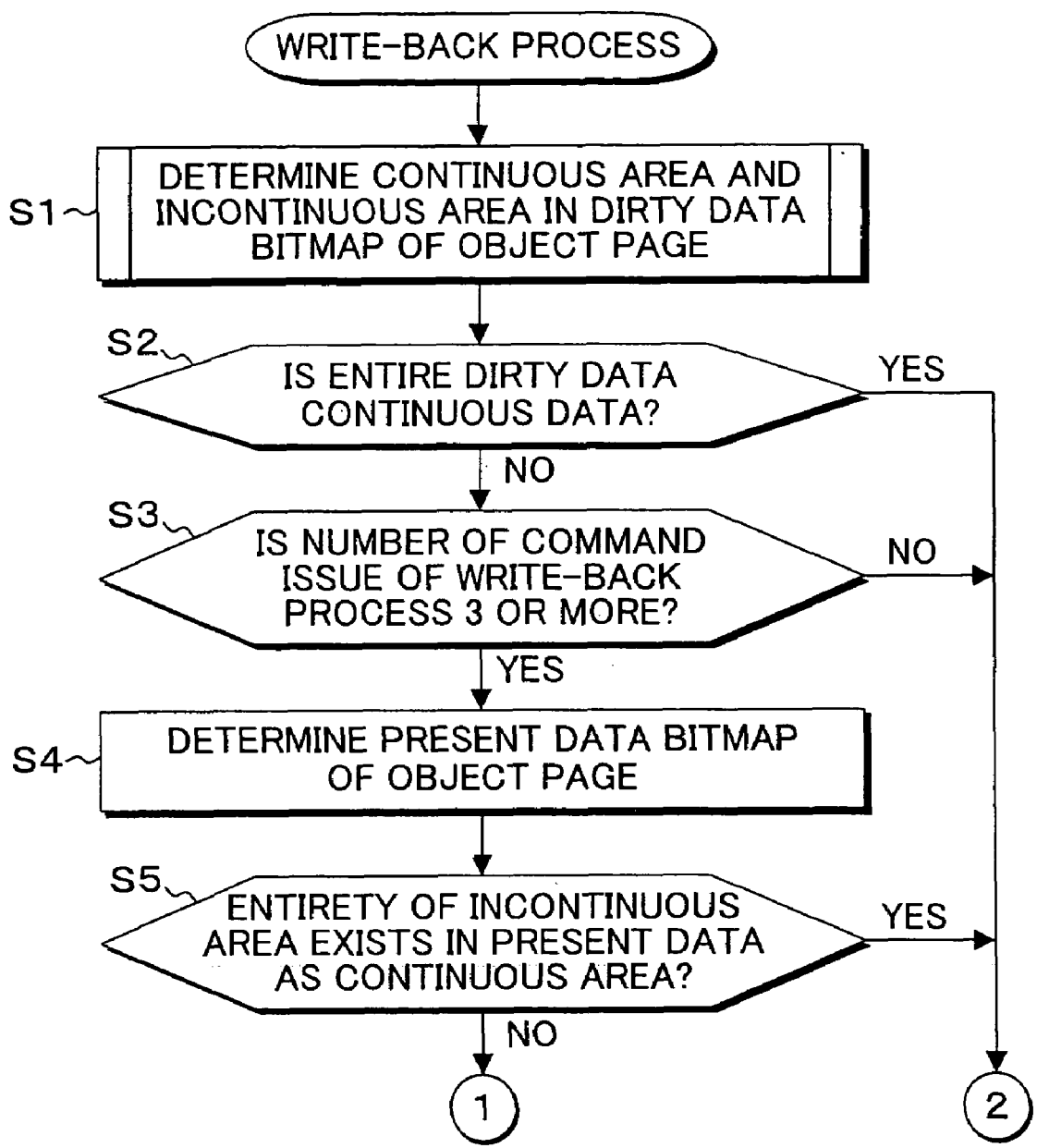
FIGS. 10A and 10B are flow charts of the write-back process according to the present invention.
Figure 10B:
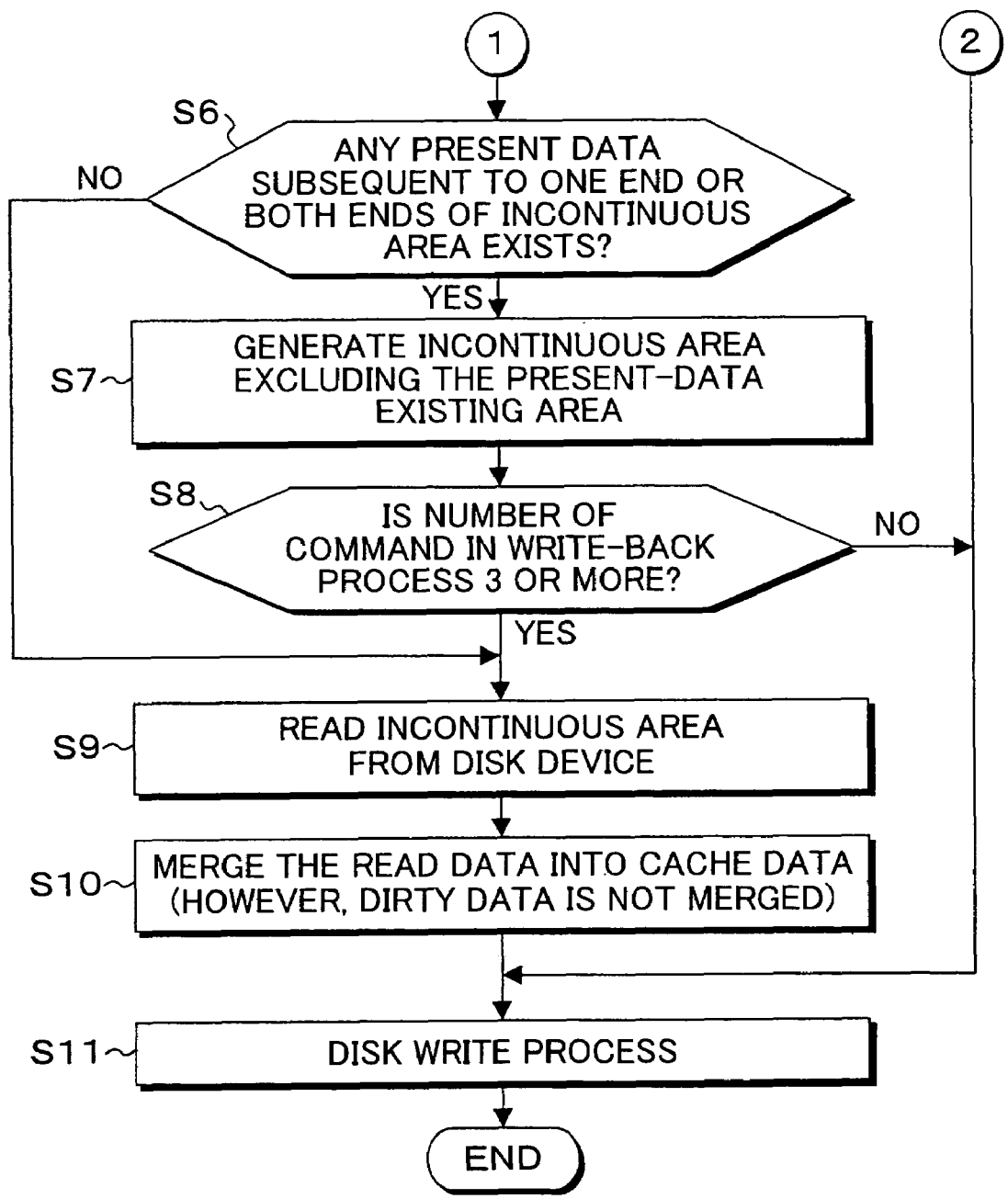

FIGS. 10A and 10B are flow charts of the write-back process according to the present invention. In FIGS. 10A and 10B, in a step S1, the write-back process determines continuous areas and incontinuous areas of dirty data in a dirty data bitmap of a page to be subjected to write back. Subsequently, in a step S2, there checked whether the entire dirty data is continuous data or not, and if it is continuous data, the process proceeds to a step S11, wherein a disk write process is executed without modification. When the dirty data is incontinuous within the page in the step S2, the process proceeds to a step S3, wherein there checked whether the number of command issue of a write-back process is three or more. When it is less than three times, i.e., when it is one time or two times, the process proceeds to the step S11, wherein a disk write process is executed without modification. When the number of command issue is three or more, the process proceeds to a step S4, wherein a present data bitmap of the object data is determined; and in a step S5, there checked whether the entirety of the incontinuous areas is caused to be present as a continuous area by virtue of the present data or not. If the entirety of the incontinuous areas is recovered as a continuous area of the present data, the process proceeds to the step S11, wherein a disk write process is executed without modification. When the entirety of the incontinuous areas is not made to be a continuous area by virtue of the present data, the process proceeds to a step S6, wherein whether present data subsequent to one end or both ends of the each continuous area is checked. If such present data is present, an incontinuous area excluding the area in which the present data is present is generated in a step S7. When such present data is not present, the process proceeds to a step S9. In a step S8, with respect to the newly generated incontinuous area, there checked whether the number of command issue of a write-back process is three or more. If it is less than three times, i.e., one time or two times, in a step S11, a disk write process is executed without modification. When the number of command issue is three or more, in the step S9, the incontinuous area is read from the disk device, and, in a step S10, the read data is merged into cache data. Certainly, the dirty data is not subjected to a merge. Then, in a step S11, there performed a disk write process of the dirty data that has been made into continuous data.

Figure 11A:
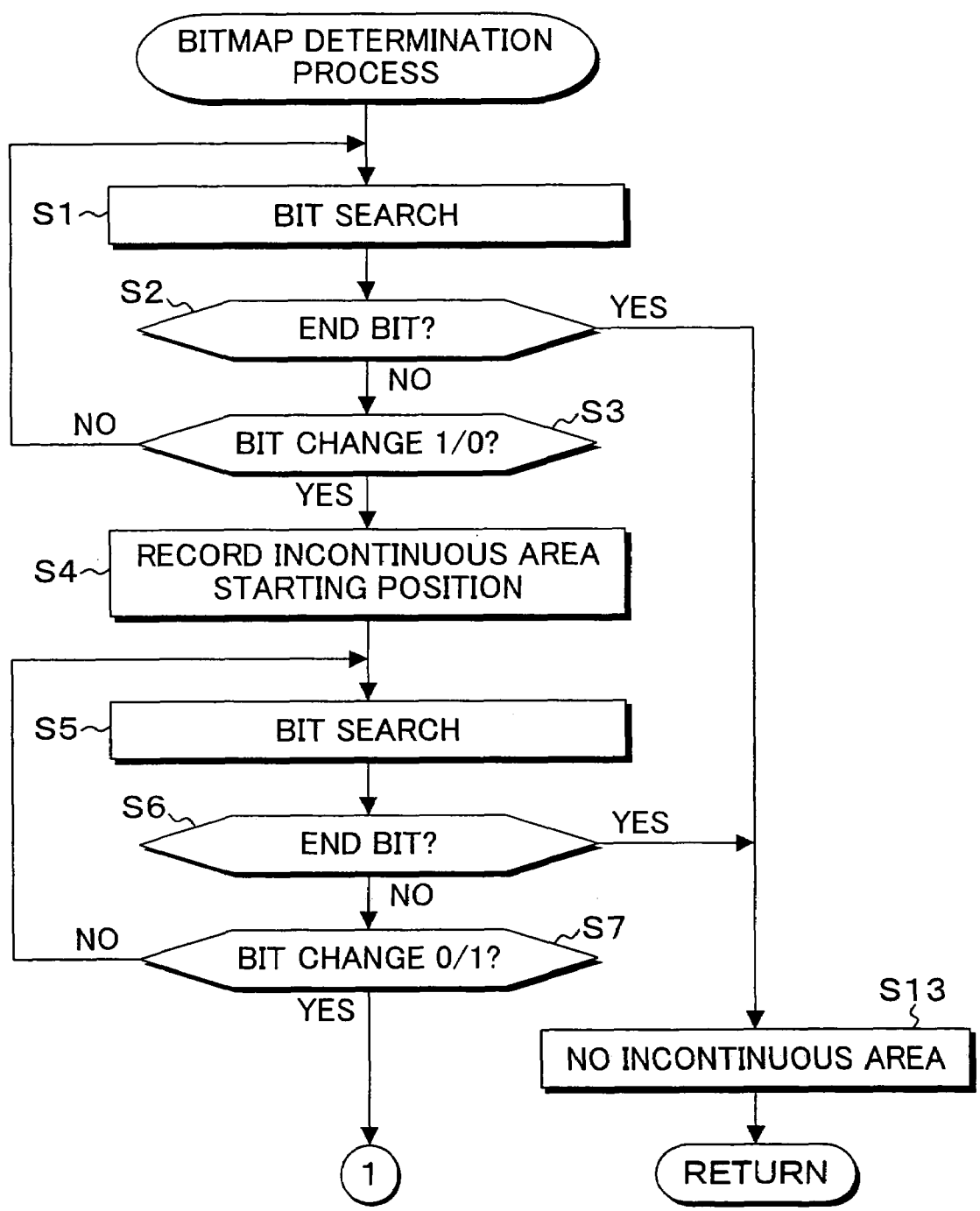
FIGS. 11A and 11B are flow charts of the determination process of a dirty date bitmap in the step S1 of FIGS. 10A and 10B.
Figure 11B:
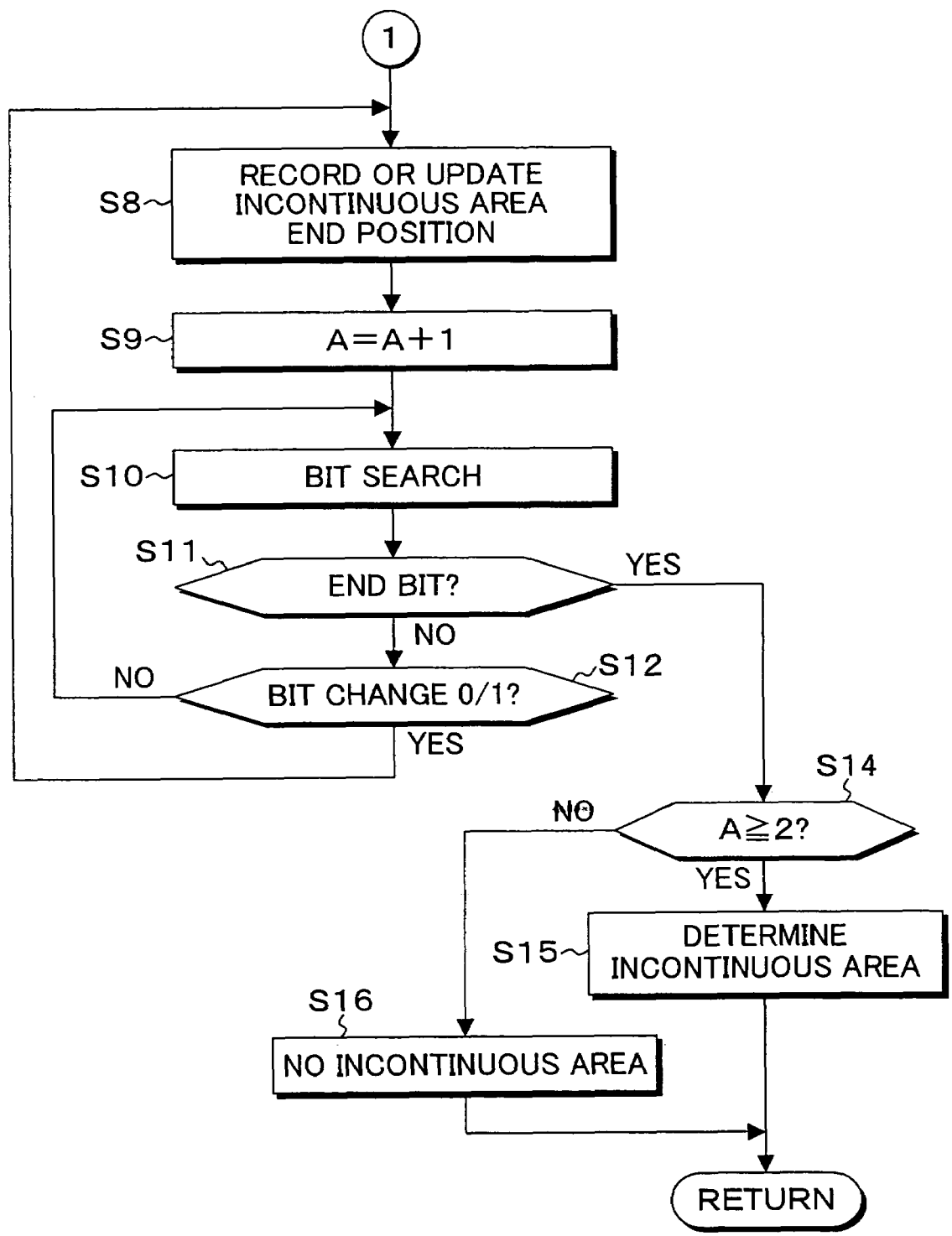

FIGS. 11A and 11B are flow charts of the determination process of a dirty data bitmap in the step S1 of FIGS. 10A and 10B, wherein there obtained a determination result that whether the incontinuous areas to be merged by reading out data from the storage device are present, or there is no incontinuous data so that a write-back can be performed without modification. In FIGS. 11A and 11B, firstly in a step S1, a bit search for each bit is started from the head of the dirty data bitmap. Subsequently, in a step S2, there checked whether it is an end bit or not. Until it reaches an end bit, in a step S3, there checked whether the bit change is from a bit 1 to a bit 0 or not. The boundary from a continuous area to an incontinuous area of dirty data is detected from the change from a bit 1 to a bit 0. When bit change from a bit 1 to a bit 0 is detected in the step S3, the process proceeds to a step S4, wherein the incontinuous area starting position is recorded, and the process proceeds to a step S5. In a step S2, when it reaches to an end bit without detecting the bit change of the step S3, the process proceeds to a step S13, wherein it is determined that there is no incontinuous area. Subsequent to a bit search of the step S5, a reach to an end bit is checked in a step S6. Then, in a step S7, there checked whether the bit change is from a bit 0 to a bit 1 or not. The boundary from an incontinuous area to a continuous area of dirty data is detected from the condition that bits are changed from 0 to 1. In a step S7, when bits are changed from a bit 0 to a bit 1, the process proceeds to a step S8, wherein the incontinuous area end position is recorded or updated. More specifically, when a first incontinuous area position is detected, it is recorded, and in a second or more time, the incontinuous area end position which has been recorded before is updated to a newly detected end position. Subsequently, in a step S9, a counter A is counted up by one. The initial value of the counter A is expressed as A=0. The counter A counts the number of incontinuous areas present between continuous areas. Subsequently, in a step S10, a bit search is started again; in a step S11, whether it is an end bit or not is checked; and, in a step S12, there detected a bit change from a bit 0 to a bit 1, i.e., the boundary position, which is of a second or more time, from an incontinuous area to a continuous area. When a change from a bit 0 to a bit 1 is detected again in the step S12, the process returns to the step S8, wherein the incontinuous area end position is updated from a previous record position to a newly detected record position. Then, the counter A is counted up by one in the step S9, and a bit search is started again in the step S10. When a reach to an end bit is determined in the step S11 during the bit search in the steps S10 to S12, the process proceeds to a step S14, wherein whether the value of the counter A counting incontinuous areas is two or more is checked. When it is two or more, the process proceeds to a step S15, wherein there determined an incontinuous area having a distribution ranges from the incontinuous area starting position detected in the step S4 to the incontinuous area end position updated in the step S8, and the process returns to the main routine of FIGS. 10A and 10B. When the number of the counter A is less than two in the step S14, in a step S16, it is determined that there is no incontinuous area, and the process returns to the step S9. When the process returns to step S9, with respect to "no incontinuous data", it is determined in the step S2 that the entire data is continuous data, alternatively, in the step S3 for determining whether the number of command issue of a write-back process is three or more, it is determined that the number is less than three; and the write-back process according to the present invention is skipped, and, in the step S11, a disk write process same as a conventional process is performed without modification.

Herein, the bitmap determination process of FIGS. 11A and 11B are described in detail as the following according to the dirty data distribution pattern of, for example, FIG. 9A. Firstly, through the processes of the steps S1 to S3, there detected the change from a bit 1 to a bit 0 at the boundary from the continuous area 58-1 in the head side of the page to the subsequent incontinuous area 66-1 in the step S3, and the starting position of the incontinuous area 60 is recorded in the step S4. Subsequently in the step S5, a bit search is performed on the incontinuous area 66-1, and after the step S6, in the step S7, there detected a change from a bit 0 to a bit 1, i.e., from the end of the incontinuous area 66-1 to the head of the continuous area 58-2. In the step S8, the last bit of the incontinuous area 66-1 is recorded as the incontinuous area end position. Subsequently, in the step S9, the counter A is counted up by one such that A=1, thereby counting the number of the incontinuous area 66-1. Then, in the step S10, a bit search of the continuous area 58-2 is started. In the bit search, since the change from a bit 0 to a bit 1 is not present in the step S12, the process is continued directly to a bit search of the incontinuous area 66-2. The bit change of the step S12, i.e., from a bit 0 to a bit 1 is detected in the bit search of the last bit of the incontinuous area 66-2 and the head bit of the subsequent continuous area 58-3. In the step S8, the previous record position is updated by the last bit of the incontinuous area 66-2 that serves as the incontinuous area end position. In the step S9, the counter A is counted up by one so that A=2, thereby counting the number of incontinuous areas. Subsequently, when the bit search in the continuous area 58-3 is repeated in the step S10, the end bit is determined in the step S11 in the bit search of the 128th bit, and the process proceeds to the step S14. When the counter A is checked therein, A=2, therefore the process proceeds to the step S15, wherein the incontinuous area 60 having the starting position of the step S4 and the end position of the step S8 can be determined. Certainly, determination of the distribution pattern of dirty data to be processed by the present invention does not have to rely on the bitmap determination process of FIGS. 11A and 11B, and an arbitrary method for pattern determination can be applied.

Meanwhile, the present invention provides a program executed by the CPU 24 of the RAID device, and the program can be implemented by a procedure according to the flow chart of FIGS. 10A and 10B and the flow chart shown in FIGS. 11A and 11B.

The present invention includes arbitrary modification that does not impair the objects and advantages thereof, and no limitation is imposed on the present invention by the numerical values described in the above described embodiments.

What is claimed is:

1. A storage system comprising:
   a cache control unit for managing data, which is in a cache memory, in a page data unit including a plurality pieces of block data each of which serving as an access unit of an upper system, and processing an input or output request of the upper system with respect to a storage device; and
   a write-back process unit for reading out a first discontinuous area from the storage device, subjecting it to a merge so as to generate a merged continuous area, and performing a write back, in a case in which dirty data in the cache memory which has been updated by the upper system and is newer than stored data in the storage device is to be written back to the storage device, and when the first discontinuous area is determined in a page of the dirty data;
   wherein, when, as a distribution of dirty data in a page, at least one third continuous area is present between a first continuous area nearest the page head and a second continuous area nearest the page end via discontinuous areas, the write-back process unit determines a second discontinuous area including the third continuous area between the first continuous area and the second continuous area, reads it out from the storage device, generates the merged continuous area by subjecting the read out data of the area which is present in the second discontinuous area and other than the third continuous area to a merge, and performs a write back.

2. The system according to claim 1, wherein, when a write-back process is to be performed by three or more times of command issue, the write-back process unit reads out a third discontinuous area from the storage device and subjects it to a merge so as to generate a continuous area, and performs a write back.

3. The system according to claim 1, wherein the cache control unit comprises:
   a dirty date bitmap for managing the presence of dirty data in the page by a bit corresponding to each block, and
   a present data bitmap for managing presence of data in the page by a bit corresponding to each block;
   wherein the write-back process unit references the dirty data bitmap and determines the first discontinuous area of dirty data in the page, and when continuous present data is determined in the present data bitmap with respect to one end or both ends of the first discontinuous area, performs a read for the remaining discontinuous area from the storage device and subjects it to a merge.

4. The system according to claim 1, wherein the size of strip data of the storage device is same as the page size of the cache memory.

5. A control method of a storage system, comprising:
   a cache control step of managing data, which is in a cache memory, in a page data unit including a plurality pieces of block data each of which serving as an access unit of an upper system, and processing an input or output request of the upper system with respect to a storage device; and
   a write-back process step of reading out a first discontinuous area from the storage device, subjecting it to a merge so as to generate page continuous data, and performing a write back in a page unit, in a case in which dirty data in the cache memory which has been updated by the upper system and is newer than stored data in the storage device is to be written back to the storage device, and when the first discontinuous area is determined in a page of the dirty data;
   wherein, when, as a distribution of dirty data in a page, at least one third continuous area is present between a first continuous area nearest the page head and a second continuous area nearest the page end via discontinuous areas, in the write-back process step, a second discontinuous area including the third continuous area between the first continuous area and the second continuous area is determined and read out from the storage device, a continuous area is generated by subjecting the read out data of the area which is present in the second discontinuous area and other than the third continuous area to a merge, and a write back is performed.

6. The method according to claim 5, wherein, when a write-back process is to be performed by three or more times of command issue, in the write-back process step, a third discontinuous area is read out from the storage device and subjected to a merge so as to generate page continuous data, and a write back is performed in a page unit.

7. The method according to claim 5, wherein, in the cache control step,
   a dirty date bitmap for managing the presence of dirty data in the page by a bit corresponding to each block, and
   a present data bitmap for managing presence of data in the page by a bit corresponding to each block are generated;
   wherein, in the write-back process step, the dirty data bitmap is referenced and the first discontinuous area of dirty data in the page is determined, and when continuous present data is determined in the present data bitmap with respect to one end or both ends of the first discontinuous area, a read for the remaining discontinuous area is performed from the storage device and it is subjected to a merge.

8. The method according to claim 5, wherein the size of strip data of the storage device is same as the page size of the cache memory.

9. A computer-readable storage medium, which stores a program for causing a computer of a storage system to execute a method comprising:
   a cache control step of managing data, which is in a cache memory, in a page data unit including a plurality pieces of block data each of which serving as an access unit of an upper system, and processing an input or output request of the upper system with respect to a storage device; and
   a write-back process step of reading out a first discontinuous area from the storage device, subjecting it to a merge so as to generate page continuous data, and performing a write back in a page unit, in a case in which dirty data in the cache memory which has been updated by the upper system and is newer than stored data in the storage device is to be written back to the storage device, and when the first discontinuous area is determined in a page of the dirty data;
   wherein, when, as a distribution of dirty data in a page, at least one third continuous area is present between a first continuous area nearest the page head and a second continuous area nearest the page end via first discontinuous areas, in the write-back process step, second discontinuous area including the third continuous area between the first continuous area and the second continuous area is determined and read out from the storage device, a continuous area is generated by subjecting the read out data of the area which is present in the second discontinuous area and other than the third continuous area to a merge, and a write back is performed.

10. The storage medium according to claim 9, wherein, when a write-back process is to be performed by three or more times of command issue, in the write-back process step, a third discontinuous area is read out from the storage device and subjected to a merge so as to generate page continuous data, and a write back is performed in a page unit.

11. The storage medium according to claim 9, wherein, in the cache control step,
  a dirty date bitmap for managing the presence of dirty data in the page by a bit corresponding to each block, and
  a present data bitmap for managing presence of data in the page by a bit corresponding to each block are generated;

wherein, in the write-back process step, the dirty data bitmap is referenced and the first discontinuous area of dirty data in the page is determined, and when continuous present data is determined in the present data bitmap with respect to one end or both ends of the first discontinuous area, a read for the remaining discontinuous area is performed from the storage device and it is subjected to a merge.

12. The storage medium according to claim 9, wherein the size of strip data of the storage device is same as the page size of the cache memory.

* * * * *

UNITED STATES PATENT AND TRADEMARK OFFICE
CERTIFICATE OF CORRECTION

| | | |
|---|---|---|
| PATENT NO. | : 7,320,055 B2 | Page 1 of 1 |
| APPLICATION NO. | : 11/090075 | |
| DATED | : January 15, 2008 | |
| INVENTOR(S) | : Mikio Ito et al. | |

It is certified that error appears in the above-identified patent and that said Letters Patent is hereby corrected as shown below:

Col. 12, line 60, after "step" insert --a--.

Signed and Sealed this

Tenth Day of June, 2008

JON W. DUDAS
*Director of the United States Patent and Trademark Office*